United States Patent
Wang et al.

(10) Patent No.: US 12,322,774 B2
(45) Date of Patent: Jun. 3, 2025

(54) BATTERY PACK AND VEHICLE

(71) Applicant: NIO TECHNOLOGY (ANHUI) CO., LTD, Hefei (CN)

(72) Inventors: Xianpeng Wang, Hefei (CN); Yaping Jiang, Hefei (CN); Linfeng Wang, Hefei (CN); Jie Fang, Hefei (CN); Shizhe Tzeng, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 158 days.

(21) Appl. No.: 17/225,244

(22) Filed: Apr. 8, 2021

(65) Prior Publication Data
US 2022/0223944 A1 Jul. 14, 2022

(30) Foreign Application Priority Data
Jan. 8, 2021 (CN) .......................... 202110023700.2

(51) Int. Cl.
| | |
|---|---|
| *H01M 10/617* | (2014.01) |
| *H01M 10/0525* | (2010.01) |
| *H01M 10/615* | (2014.01) |
| *H01M 10/6571* | (2014.01) |
| *H01M 10/6572* | (2014.01) |
| *H01M 10/658* | (2014.01) |

(Continued)

(52) U.S. Cl.
CPC ..... *H01M 10/617* (2015.04); *H01M 10/0525* (2013.01); *H01M 10/615* (2015.04); *H01M 10/6571* (2015.04); *H01M 10/6572* (2015.04); *H01M 10/658* (2015.04); *H01M 50/209* (2021.01); *H01M 50/249* (2021.01)

(58) Field of Classification Search
CPC .......... H01M 10/617; H01M 10/0525; H01M 10/615; H01M 10/6571; H01M 10/6572; H01M 10/658; H01M 50/209; H01M 50/249
See application file for complete search history.

(56) References Cited

U.S. PATENT DOCUMENTS

| | | | |
|---|---|---|---|
| 10,121,997 B1 * | 11/2018 | Blanco .............. | H01M 10/6563 |
| 2013/0127423 A1 * | 5/2013 | Liang ................... | H02J 7/0025 |
| | | | 429/153 |

(Continued)

FOREIGN PATENT DOCUMENTS

| | | | |
|---|---|---|---|
| DE | 102018205412 A1 * | 10/2019 | |
| DE | 102018217387 | 4/2020 | |

(Continued)

OTHER PUBLICATIONS

Aschenbrenner et al. (DE102018205412A1 and using Machine Translation as English version) (Year: 2019).*

(Continued)

*Primary Examiner* — Milton I Cano
*Assistant Examiner* — Joshua P McClure
(74) *Attorney, Agent, or Firm* — Sheridan Ross P.C.

(57) ABSTRACT

The invention provides a battery pack and a vehicle. A cell group is configured in the battery pack, and the cell group comprises a plurality of cells, wherein the cells comprise first cells and second cells, the first cells have a better cold resistance than the second cells, and arrangement positions of the first cells and the second cells depend on the heat dissipation capacity in the battery pack.

18 Claims, 3 Drawing Sheets

(51) Int. Cl.
*H01M 50/209* (2021.01)
*H01M 50/249* (2021.01)

(56) References Cited

U.S. PATENT DOCUMENTS

| | | | | |
|---|---|---|---|---|
| 2015/0204948 A1* | 7/2015 | Karoui | .............. | H01M 10/4207 |
| | | | | 429/158 |
| 2017/0179553 A1* | 6/2017 | Guena | ................. | H01M 10/613 |
| 2017/0365886 A1* | 12/2017 | Hoshina | ............ | H01M 10/0525 |
| 2019/0054827 A1* | 2/2019 | Jiang | ................... | H01M 10/425 |
| 2019/0181399 A1* | 6/2019 | Kaga | ................... | H01M 50/503 |
| 2019/0225093 A1* | 7/2019 | Li | ....................... | H01M 50/242 |

FOREIGN PATENT DOCUMENTS

| | | | |
|---|---|---|---|
| JP | 2012-160283 | | 8/2012 |
| JP | 2012160283 A | * | 8/2012 |
| JP | 2019096399 A | * | 6/2019 |

OTHER PUBLICATIONS

Asai et al. (JP2019096399A and using Machine Translation as English version) (Year: 2019).*
Tenmei et al. (JP2012160283A and using Machine Translation as English version) (Year: 2012).*
Sekhar et al. "Thermal simulation of battery module with updation of thermal resistance of air," 35th International Technical Conference on Circuits/Systems, Computers and Communications (ITC-CSCC), IEICE, Jul. 2020, pp. 389-394.
Extended Search Report for European Patent Application No. 21167091.4, dated Oct. 7, 2021, 9 pages.

* cited by examiner

BATTERY PACK AND VEHICLE

CROSS-REFERENCE TO RELATED APPLICATION

This application claims the benefit of China Patent Application No. 202110023700.2 filed Jan. 8, 2021, the entire contents of which are incorporated herein by reference.

TECHNICAL FIELD

The invention relates to the technical field of vehicles, specifically, to a battery pack and a vehicle provided with the battery pack, and in particular, to a design solution of a high-performance battery composed of cells with different chemical systems and an all-weather battery pack with AB cells.

BACKGROUND ART

With the increase in the market share of new energy vehicles, especially battery electric vehicles, usage scenarios of electric vehicles, especially the cold usage environment in North China, are becoming more and more common. As core components of electric vehicles, batteries bring great challenges to the driving experience, service life and safety of new energy vehicles in extreme temperature environments.

When a vehicle stands still in a cold environment for a long time, the temperature distribution in a battery pack shows a certain rule. In an area with rapid heat dissipation, the temperature of cells drops significantly, which usually brings about an excessive temperature difference between the cells. Several cells at a temperature below a critical temperature limit the discharge performance of the whole pack, and also affect the service life and safety of the battery pack.

The patent CN 108258365 A discloses a traction battery pack capable of automatically adjusting a heat exchange level depending on the ambient temperature and a temperature control method. A traction battery base is hermetically connected to an upper cover, a central ring is mounted in a central hole of the upper cover, and an upper end of a thermometer is fix to the upper cover; one end of a piston rod and a piston are installed in the thermometer, and the other end of the piston rod extends out of the upper cover and passes through a hole of the central ring and is then fixed; a plurality of holes are formed around the central hole of the upper cover of the traction battery, superconducting heat pipes are mounted in the holes respectively, and an upper end of each of the superconducting heat pipes is fixed to the upper cover; and an outer ring of the central ring is provided with a plurality of connecting rods, the other end of each of the connecting rods is respectively provided with a heat insulating cap, which respectively covers the upper end of the respective superconducting heat pipes. According to the temperature change in the battery pack, mercury pushes the piston to make the piston rod rise or fall, so that heat is dissipated according to a distance by which the heat insulating cap is exposed outside the upper end of the superconducting heat pipe. It is ensured that the traction battery works within the normal temperature range, the battery performance is improved, and the service life of the battery is prolonged. The whole structure has the functions of sealing, water resistance, oil resistance, etc.

SUMMARY OF THE INVENTION

An objective of the invention is to solve the problems that in an extremely cold environment scenario, a difference between temperatures of cells is large and the temperatures of cells in several areas are lower than a critical temperature, affecting the discharge performance of a whole pack; and to solve the shortest stave effect, which significantly improves the service performance after standing at low temperatures, so that even if the difference between the temperatures of cells is large, the normal use of the battery pack is not affected.

In addition, the invention also aims to solve or alleviate other technical problems existing in the prior art.

The invention provides a battery pack and a vehicle to solve the above problems. Specifically, according to an aspect of the invention, provided is a battery pack, a cell group being configured in the battery pack, the cell group comprising a plurality of cells, wherein the cells comprise first cells and second cells, the first cells have a better cold resistance than the second cells, and arrangement positions of the first cells and the second cells depend on the heat dissipation capacity in the battery pack.

Optionally, according to an embodiment of the invention, the heat dissipation capacity in the battery pack is determined through heat flux simulation.

Optionally, according to an embodiment of the invention, the battery pack is provided with a casing, the cell group is arranged in the casing, and a heat insulating material is arranged at the casing.

Optionally, according to an embodiment of the invention, the heat insulating material is configured outside the casing, and/or the heat insulating material is arranged at the bottom of the casing.

Optionally, according to an embodiment of the invention, the casing is configured as a split structure provided with a first sub-casing and a second sub-casing, and the heat insulating material is arranged between the first sub-casing and the second sub-casing.

Optionally, according to an embodiment of the invention, the battery pack is provided with a thermal compensation device configured to relieve a temperature drop rate of the first cells and/or the second cells.

Optionally, according to an embodiment of the invention, the thermal compensation device comprises a graphene heating film or a Peltier effect device.

Optionally, according to an embodiment of the invention, the thermal compensation device is arranged on a maximum path of heat dissipation from the battery pack to an external environment.

Optionally, according to an embodiment of the invention, the maximum path is determined through heat flux analysis.

Optionally, according to an embodiment of the invention, the battery pack is provided with a heating device configured to increase the temperature of the first cells and/or the second cells.

Optionally, according to an embodiment of the invention, the heating device comprises a hydrothermal heating device, a PTC heater, a heating wire and/or a graphene heating sheet.

Optionally, according to an embodiment of the invention, the first cells are ternary lithium-ion cells, and/or the second cells are lithium iron phosphate cells.

Optionally, according to an embodiment of the invention, the battery pack is configured as a structure with a rectangular cross-section, and the first cells are disposed at four corners of the rectangle in the battery pack.

According to another aspect of the invention, the invention provides a vehicle, wherein the vehicle is provided with any one of the battery packs as described above.

The provided battery pack and the vehicle have the following advantages: 1. passive heat preservation time is prolonged, and the battery pack can be stored/used in a low temperature environment for a long time; 2. the shortest stave effect is overcome, and after standing for a super long time, the whole vehicle can be used normally under this condition, which lowers the lower limit of the temperature in use; 3. after standing at extremely cold temperatures for a super long time and below a certain temperature value, the temperature drop trend slows down significantly, thereby greatly prolonging the storage/use time in the extremely cold environment; 4. after continuing to stand in extreme cold, the temperature of the cells is increased to the temperature range of normal use; and 5. the solution is economical and efficient.

BRIEF DESCRIPTION OF THE DRAWINGS

The foregoing and other features of the invention will be apparent with reference to the accompany drawings, in which.

DETAILED DESCRIPTION OF EMBODIMENTS

It can be readily understood that according to the technical solution of the invention, a person of ordinary skill in the art may propose multiple interchangeable structures and implementations without changing the essential spirit of the invention. Therefore, the following specific embodiments and the accompanying drawings are merely exemplary descriptions of the technical solutions of the invention, and should not be construed as the entirety of the invention or construed as limiting the technical solution of the invention.

Directional terms, such as up, down, left, right, front, rear, front side, back side, top, and bottom, which are or may be mentioned in this description, are defined with respect to the structures shown in the accompanying drawing, and are relative concepts, and therefore may correspondingly vary depending on different positions and different conditions in use. Therefore, these or other orientation terms should not be construed as restrictive terms as well. Moreover, the terms such as "first" "second", "third" or similar expressions are only used for description and distinction purposes, and should not be construed as indicating or implying the relative importance of corresponding components.

Figure 1:
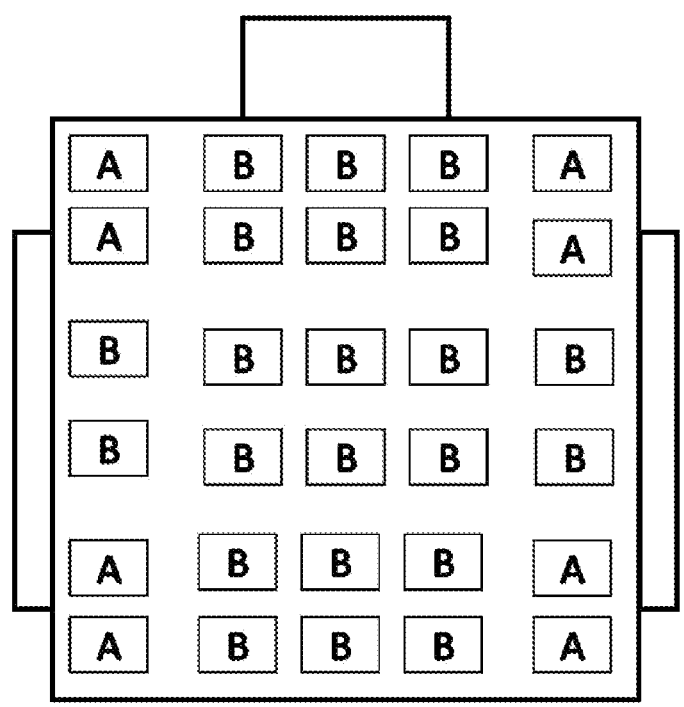
FIG. 1 shows an arrangement example of a cell group of a battery pack according to the invention.

Reference is made to FIG. 1, which shows an arrangement example of a cell group 4 of a battery pack 100 according to the invention.

The cell group 4 is configured in the battery pack 100. The cell group 4 comprises a plurality of cells, wherein the cells comprise first cells A and second cell B, the first cells A have a better cold resistance than the second cells B, and arrangement positions of the first cells A and the second cell B depend on the heat dissipation capacity in the battery pack 100.

Through the above technical solution, cells with different cold resistances are adopted, and corresponding cells are arranged in areas with different heat dissipation capabilities, so that the problem that in an extremely cold environment scenario, a difference between the temperatures of cells is large and the temperatures of cells in several areas are lower than a critical temperature, affecting the discharge performance of a whole pack is solved; in addition, the shortest stave effect is solved, which significantly improves the service performance after standing at low temperatures, so that even if the difference between the temperatures of cells is large, the normal use of the battery pack is not affected.

It should be understood that the first cells A are placed in areas where heat is dissipated quickly, while the second cells B are placed in areas where heat is dissipated slowly. If the same cells are used, in this case, for example, when the cells work/stand in a low temperature environment, the temperature of the cells decreases and the temperature difference increases. After a period of time, if cells in the battery pack are all the second cells B, the battery is limited by several low-temperature cells, which affects the discharge performance. Through this technical solution, the first cells A with better low-temperature performance are placed in the areas where heat is dissipated quickly, so that the lower temperature limit is expanded and the overall low-temperature performance of the battery pack 100 becomes better. In addition, the battery pack may be a traction battery pack.

The heat dissipation rate may be determined through heat flux simulation. In this case, faster heat dissipation means larger heat flux, while slower heat dissipation means smaller heat flux. Heat flux simulation may also be referred to as heat flux analysis or, more broadly, thermal simulation. Thermal simulation is a virtual experiment, which can be used to calculate a heat dissipation risk of products under different operation scenarios by inputting a series of information data without making actual products, so as to pre-determine the heat dissipation of the products in advance, thereby saving the research and development time and proofing costs. Simulation software may be, for example, FLOTHERM, ANSYS ICEPACK, 6 SIGNMAET, FLOEFD, etc.

For example, in FIG. 1, the layout of the first cells A and the second cells B is illustratively described. It can be seen from the figure that the battery pack 100 mainly presents a rectangular cross-section, the first cells A are disposed at four corners inside the battery pack 100, and the second cells B are disposed at the remaining positions. Of course, for some battery packs, the middle area is an area where heat is dissipated quickly and the first cells A should be arranged, so the arrangement of the two kinds of cells needs to be determined according to the actual situation of the battery pack. The arrangement positions of the two kinds of cells (including the distance between every two cells, the number of the cells, etc.) may also be determined through the actual measurement of heat dissipation.

In addition to the above technical solution about the combination of the first cells A and the second battery cells B, structural heat insulation may also be used to improve the working capability of the battery pack 100 in an extremely cold environment.

Figure 2:
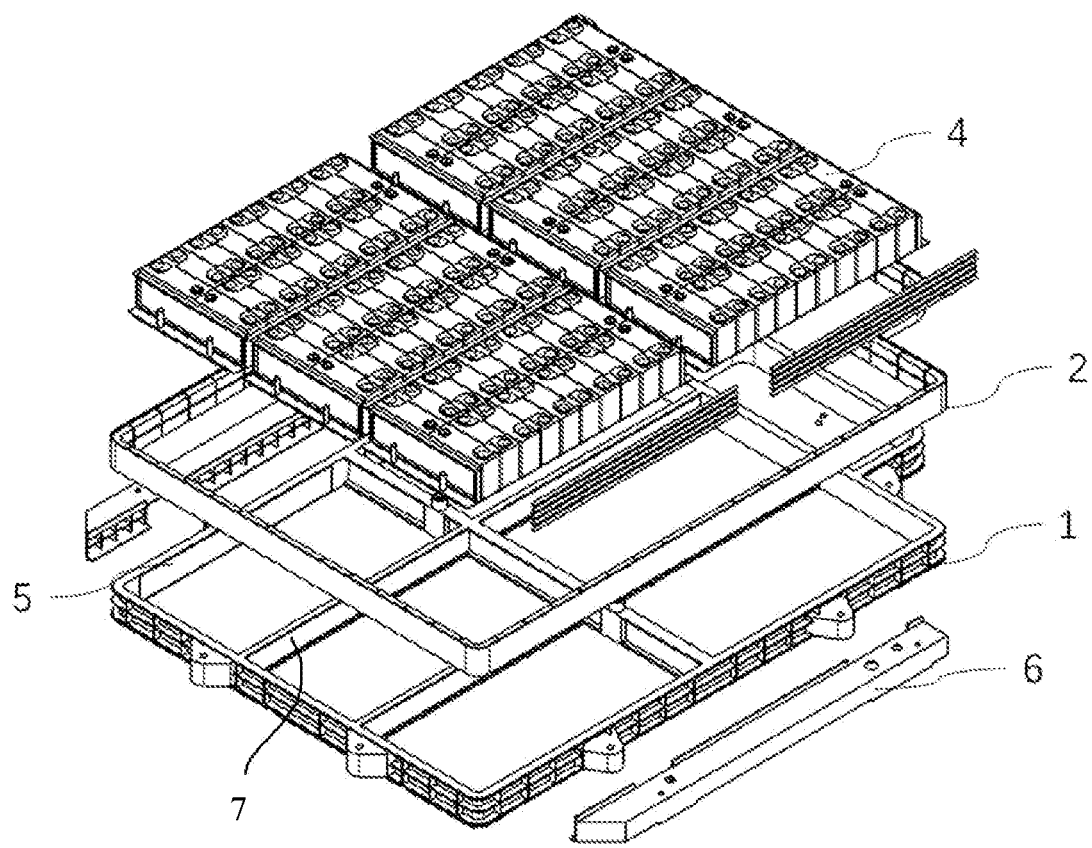
FIG. 2 shows an exploded schematic diagram of a battery pack according to the invention.
Figure 3:
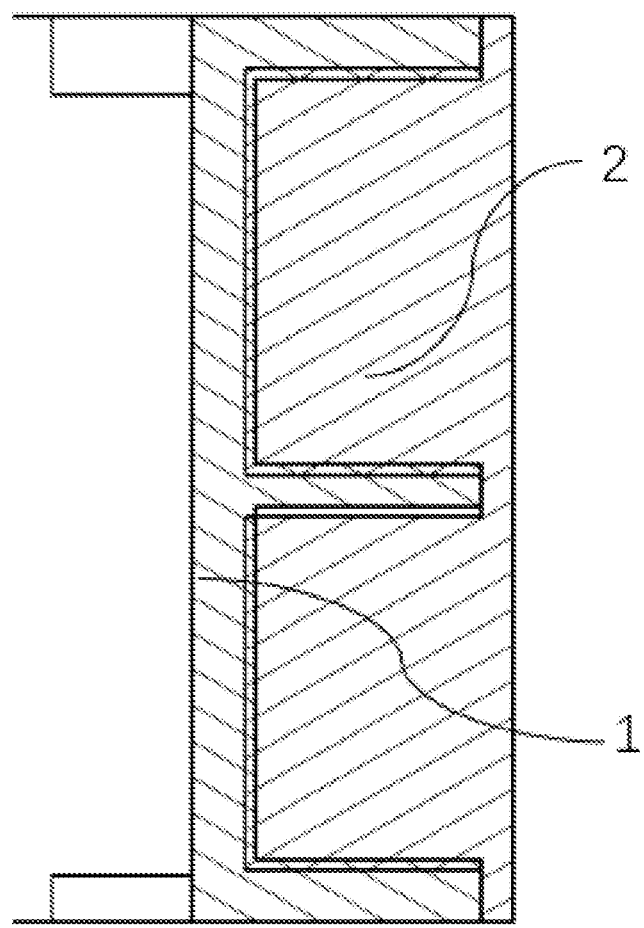
FIG. 3 shows a cross-sectional view of a battery pack according to the invention.

References are made to FIGS. 2 and 3, which respectively show an exploded schematic diagram of a battery pack 100 according to the invention; and a cross-sectional view of a battery pack 100 according to the invention.

The battery pack 100 is provided with a casing 1, and the casing 1 is, for example, presented as a frame with a rectangular cross-section. The cell group 4 is arranged in the casing 1, and a heat insulating material is arranged at the casing 1.

Heat transfer is blocked through the arrangement of the heat insulating material (also referred to as a thermal insulation material or a heat insulation material), so as to achieve the effect of heat preservation. The heat insulating material may be, for example, glass fiber, asbestos, stone wool, silicate, aerogel felt, vacuum sheet, etc.

As for the specific arrangement of the heat insulating material, illustratively, the heat insulating material is configured outside the casing 1 and/or the heat insulating material is arranged at the bottom of the casing 1. The heat insulating material outside the casing 1 is, for example, a foamed material 6 with a certain thickness, which has a low thermal conductivity and good waterproofness, thermal insulation performance and strength. The heat insulating material at the bottom of the casing 1 may be, for example, a non-metallic material, which plays a role in thermal insulation, and may be specifically an inorganic non-metallic material.

In addition, the casing 1 is composed of a profile, which may be an extruded profile or a casting, and the casing 1 may also be configured as a split structure with a first sub-casing and a second sub-casing. In this case, the heat insulating material is arranged between the first sub-casing and the second sub-casing. In this case, the first sub-casing and the second sub-casing may be fastened and connected through threaded fasteners (such as bolts).

It should be understood that the above structural heat insulation measures may be used alone or in combination, and the design of the heat insulating material and/or the casing can be modified according to actual conditions, which falls within the scope of protection of this application. For example, in the frame of the casing 1, a frame with the same shape is arranged as a heat insulating filling material 2.

In addition to the above technical solution regarding the cell combination of the first cells A and the second cells B and the structural heat insulation, heat compensation and/or heating strategies may also be used to improve the working capability of the battery pack 100 in an extremely cold environment.

The so-called thermal compensation is a technical means used to relieve a temperature drop trend or rate of a component. Herein, the battery pack 100 is provided with a thermal compensation device 5 configured to relieve a temperature drop rate of the first cells A and/or the second cells B. Through thermal compensation, standing/use time of the battery in a low temperature environment can be greatly prolonged.

The thermal compensation device 5 may specifically comprise a graphene heating film or a Peltier effect device.

Graphene is a good conductor of electricity and heat. When the graphene is used in a heating film, it can conduct electricity. When combined with other components such as resin, the graphene can form a resistance part, which can generate heat after being electrified. In addition, the graphene can quickly transfer heat to parts with unbalanced temperature distribution after the heating film generates heat. Therefore, the whole graphene heating film is used as a heating surface (which is different from other resistance wire heating films), so that the heating is faster and the temperature distribution is more balanced.

Peltier effect means that when current passes through a circuit composed of different conductors, besides irreversible Joule heat, heat absorption and heat release respectively occur at junctions of the different conductors depending on different current flow directions. Specifically, since charge carriers are at different energy levels in different materials, when they move from a high energy level to a low energy level, they release excess energy; in contrast, when they move from a low energy level to a high energy level, they absorb energy from the outside. Energy is absorbed or released in the form of heat at the interface between two materials. This effect is reversible. If the current flow direction is reversed, heat absorption will be changed into heat release.

Therefore, the above effect can be utilized to perform thermal compensation on the cells through the temperature difference generated when the current passes. A device that operates according to this principle is referred to as a Peltier effect device.

The thermal compensation device can be arranged on a maximum path of heat dissipation from the battery pack 100 to the external environment, and usually on an interface of some metal connections (such as at the frame of the casing). Thermal compensation is designed at these special positions. As mentioned above, since energy is absorbed or released in the form of heat at the interface between two materials, the arrangement position at the interface can give full play to the Peltier effect.

The position of the maximum path may also be determined through heat flux analysis. The introduction of the heat flux analysis is detailed above, and will not be repeated herein.

The thermal compensation device 5 is illustratively arranged on an inner side of the casing 1 in the figure, and spans a plurality of cells of the cell group 4, so as to be able to perform balanced thermal compensation on the plurality of cells.

Therefore, when the temperature is lower than a certain threshold, a battery management system (BMS) enables the thermal compensation function. It should be emphasized that the power used by and the position of the thermal compensation device may be obtained through calculation or experiment, and the device is an economical device that can alleviate the temperature loss.

Heating measures can also be used alone or in combination with the above thermal compensation means. That is, the battery pack 100 is provided with a heating device 7 configured to increase the temperature of the first cells A and/or the second cells B. As described above, the thermal compensation is used to greatly prolong standing/use time of the battery in a low temperature environment. Then, on this basis, if the battery continues to be stored in the extremely cold environment, the heating strategy is designed to make the battery more resistant to the extremely cold environment for a long time, so that none of the temperatures of the cells is lower than the critical value in a super long-time standing scenario.

The heating device 7 may comprise a hydrothermal heating device, a PTC heater, a heating wire and/or a graphene heating sheet. The hydrothermal heating device refers to a device that achieves the heating effect by using a hydrothermal method, and the hydrothermal method refers to a method that uses the temperature difference of water as a medium to heat corresponding cells. For example, the hydrothermal effect may be achieved by constructing a cold plate at the casing 1 and at the corresponding cells and by introducing heated water into the cold plate. The water may be heated at a peripheral area outside the battery pack 100.

The PTC heater, also referred to as a PTC heating unit, is generally composed of a PTC ceramic heating element and an aluminum tube, and has the advantages of low thermal resistance, high heat exchange efficiency, automatic constant temperature, etc. In any application, the phenomenon of "reddening" at the surface of an electric heating tube-type heater does not occur, and hidden dangers such as scald and fires are avoided. In addition, the PTC heater is easy to install, for example, it may be installed at a specified position through simple pasting, threaded connection, and snap-fit connection. The PTC refers to positive temperature coefficient.

In addition, the heating wire is also a heating device 7 that is very easy to install and disassemble. See above for the description of graphene heating.

It should be noted that the above various means of heat preservation, cell combination arrangement, thermal compensation or heating can be used alone or in combination.

With regard to the chemical materials of the first cells A and the second cells B, illustratively, the first cells A are ternary lithium-ion cells, and/or the second cells B are lithium iron phosphate cells. Ternary means using nickel salt, cobalt salt and manganese salt as raw materials, for example, the cathode material is made from nickel-cobalt-manganese or nickel-cobalt-aluminum, which has the characteristics of high safety. The lithium iron phosphate cell has high working voltage, high energy density, long cycle life, good safety performance, small self-discharge rate and no memory effect.

Therefore, for example, when the cells A/B at different positions are respectively lower than the critical temperature, the heating function can be enabled. A specific control strategy may be as follows: With Ti as a target temperature, a heater power P1 is activated, and the power P1 is adjusted by looking up a pre-imported temperature rise rate table based on an intended temperature rise time t. The temperature rise rate table may be calculated or actually determined by using a difference $\Delta T$ between the temperature of the cells and the temperature of the environment, a water temperature Tc, a heat capacity C of the battery pack and other parameters.

It should be understood that the battery pack 100 according to the invention can be installed on various vehicles, including battery electric vehicles or hybrid vehicles in the form of cars, trucks, buses, etc. Therefore, the subject matter of the invention further aims to set forth various vehicles provided with the battery pack 100 according to the invention.

In conclusion, due to the design of structural heat preservation, passive heat preservation time is prolonged, and the battery pack can be stored/used in a low temperature environment for a long time. After standing for a long time, the temperature of the cells decreases, the temperature difference of the cells increases, and the temperature in several areas is lower than the critical value, which affects the discharge performance of the whole pack. The cells A are used in these areas, such that the AB combined battery pack is formed, which solves the shortest stave effect, so that the whole vehicle can be used normally under this condition, thereby lowering the lower temperature limit in use; and after standing at extremely cold temperatures for a super long time, the active thermal compensation function is enabled, which makes the temperature drop trend significantly slow down when the temperature is lower than a certain temperature value. The storage/use time in the extremely cold environment is greatly prolonged. On this basis, after continuing to stand in extreme cold, the heating function is enabled to raise the temperature of the cells to the temperature range of normal use; and the above functions can be optimized based on thermal simulation/heat flux analysis of the battery pack, to obtain the most economical and efficient solution.

It should be understood that all of the above preferred embodiments are exemplary rather than limiting, and any modification or variation made by those skilled in the art to the specific embodiments described above without departing from the concept of the invention shall fall within the scope of legal protection of the invention.

The invention claimed is:

1. A battery pack, comprising:
   a casing; and
   a cell group comprising a plurality of cells arranged in rows and columns in the casing when viewed from a plan view, the plurality of cells including first cells and second cells, wherein the first cells have a better cold resistance than the second cells in that discharge performance of the first cells is better than the second cells in a same low temperature condition of an external environment, wherein arrangement positions of the first cells and the second cells in the casing depend on heat dissipation capacity of the battery pack so that the first cells are arranged at locations in the battery pack where a heat dissipation rate is greater than a heat dissipation rate of locations in the battery pack where the second cells are arranged, wherein the heat dissipation capacity of the battery pack is determined through heat flux simulation, wherein the first cells are ternary lithium-ion cells, wherein the second cells are lithium iron phosphate cells, wherein, in the plan view, a first row of the plurality of cells at a first end of the casing includes ternary lithium-ion cells and lithium iron phosphate cells, and wherein, in the plan view, a second row of the plurality of cells includes only lithium iron phosphate cells.

2. The battery pack according to claim 1, further comprising a heat insulating material is arranged at the casing.

3. The battery pack according to claim 2, wherein the heat insulating material is outside the casing, and the heat insulating material is arranged at a bottom of the casing.

4. The battery pack according to claim 2, wherein the casing comprises a split structure provided with a first sub-casing and a second sub-casing, and wherein the heat insulating material is arranged between the first sub-casing and the second sub-casing.

5. The battery pack according to claim 1, further comprising a thermal compensation device configured to adjust a temperature drop rate of the first cells and the second cells.

6. The battery pack according to claim 5, wherein the thermal compensation device comprises a graphene heating film or a Peltier effect device.

7. The battery pack according to claim 5, wherein the thermal compensation device is arranged at a location corresponding to an interface between the battery pack and the external environment.

8. The battery pack according to claim 7, wherein the location is determined through heat flux analysis.

9. The battery pack according to claim 1, further comprising a heating device configured to increase a temperature of the first cells or the second cells.

10. The battery pack according to claim 9, wherein the heating device comprises a hydrothermal heating device, a PTC heater, a heating wire, and/or a graphene heating sheet.

11. A vehicle, comprising the battery pack according to claim 1.

12. The battery pack according to claim 1, further comprising:
   a heat insulating material arranged at a bottom of the casing.

13. The battery pack according to claim 12, wherein the heat insulating material comprises a frame having a same shape as the casing.

14. The battery pack according to claim 12, further comprising:

a thermal compensation device attached to an inner wall of the casing.

15. The battery pack according to claim 14, wherein the casing comprises multiple sections.

16. The battery pack according to claim 14, wherein the thermal compensation device comprises a Peltier effect device or a heating film.

17. A battery pack, comprising:
a casing; and
a cell group comprising a plurality of cells arranged in the casing, the plurality of cells including first cells and second cells, wherein the first cells have a better cold resistance than the second cells in that discharge performance of the first cells is better than the second cells in a same low temperature condition of an external environment, wherein the first cells are ternary lithium-ion cells, wherein the second cells are lithium iron phosphate cells, wherein, in a plan view, the cell group is configured as a rectangular structure, wherein, in the plan view, the ternary lithium-ion cells are disposed at four corners of the rectangular structure, and wherein, in the plan view, the lithium iron phosphate cells are disposed in areas of the rectangular structure between the four corners of the rectangular structure.

18. A battery pack, comprising:
a casing; and
a cell group comprising a plurality of cells arranged in the casing, the plurality of cells including first cells and second cells, wherein the first cells have a better cold resistance than the second cells in that discharge performance of the first cells is better than the second cells in a same low temperature condition of an external environment, wherein the first cells include ternary lithium-ion cells, wherein the second cells include lithium iron phosphate cells, wherein, in a plan view, the casing has a rectangular shape, and wherein, in the plan view, the ternary lithium-ion cells are at each corner of the rectangular shape with at least one of than the lithium iron phosphate cells being positioned between one or more ternary lithium-ion cells in a first corner of the rectangular shape and one or more ternary lithium-ion cells in a second corner of the rectangular shape that is adjacent to the first corner.

\* \* \* \* \*